United States Patent Office 3,112,181
Patented Nov. 26, 1963

3,112,181
PRODUCTION OF GRAPHITE FROM PETROLEUM
Gunnar G. Petersen, Skovlunde, Denmark, and Jacobus J. Verstappen, The Hague, Netherlands, assignors to Shell Oil Company, New York, N.Y., a corporation of Delaware
No Drawing. Filed May 7, 1959, Ser. No. 811,523
Claims priority, application Netherlands May 8, 1958
4 Claims. (Cl. 23—209.1)

This invention relates to an improved process for the preparation of petroleum coke suitable for conversion into graphite to be used as a moderator in nuclear reactors.

It is well known that in the production of energy from fissile materials, use is made of a so-called moderator material, the purpose of which is to slow down neutron velocities in order to increase the possibility of neutron capture by nuclei for fission purposes. In general, fissionable materials absorb slow neutrons more readily than fast neutrons. The slowing down or "moderation" of neutrons is achieved by elastic collision between the neutron and the nuclei of the moderator element, since each collision results in the transfer of some of the neutron energy to the moderator atom struck. The slowed neutrons will diffuse in the nuclear reactor until they are captured by the fissile material whereby a chain reaction is maintained.

The main properties which determine the suitability of a substance to function as a moderator material are a low atomic weight and a low affinity for neutron capture. This affinity is usually labeled as neutron capture cross section and is expressed in "barns." Examples of substances having these properties are heavy water, graphite, and beryllium. Graphite has an additional advantage in being in plentiful supply and therefore relatively cheap.

It is known to produce graphite from petroleum coke. However, to be used as a moderator, it is essential that graphite be substantially free of impurities, particularly those impurities having a high neutron capture cross section, such as boron, cadmium, and vanadium. Boron in particular is highly detrimental to neutron economy of a nuclear reactor. Petroleum coke is generally produced from residual hydrocarbons, i.e., hydrocarbon mixtures such as pitch or "topped" crude remaining behind in the distillation of crude petroleum, and therefore contains relatively large quantities of mineral contaminants. Such coke would have to be subjected to special and costly purification processes to remove the contaminants before it would be suitable for conversion into "moderator graphite."

It has been proposed to produce petroleum coke suitable for "moderator" graphite from petroleum distillates. However, the yield of coke obtained from distillates with convenitonal processes for producing petroleum coke is relatively low since most of the distillate is converted into gaseous and liquid products.

An object of the present invention is to provide an improved process for the production of petroleum coke suitable for conversion into graphite to be used as a moderator in nuclear reactors. A more particular object is to provide an improved process for the production of petroleum coke in relatively high yield from petroleum distillates which is suitable for conversion into graphite to be used as a moderator in nuclear reactors.

It has now been discovered that petroleum coke suitable for conversion into graphite to be used in nuclear reactors can be produced in relatively high yield from a petroleum distillate when the distillate is first contacted with oxygen or an oxygen-containing gas at a temperature of from about 175° C. to about 400° C. prior to being subjected to coking conditions.

The expression "distillate" as used herein refers to a hydrocarbon material separated from a crude or synthetic (e.g., Fischer-Tropsch) petroleum oil by physical means such as distillation or extraction. The distillation may be entirely or partly effected under such conditions that there is also a certain amount of cracking of the starting material, the operations being carried out in the presence or absence of hydrogen. It is also meant to include products consisting entirely or substantially of hydrocarbons obtained from further treatment of such hydrocarbon materials by physical, thermal, catalytic, or other means or a combination thereof.

Pretreatment of the hydrocarbon material with an oxygen-containing gas is preferably carried out at a temperature in the range of from about 250° C. to about 350° C. The pretreatment may be carried out at atmospheric or superatmospheric pressure, for example 2–5 atmospheres pressure. The oxygen-containing gas may be air, either as is or enriched with oxygen. It is preferred to use sufficient oxygen-containing gas to provide about 50 to about 175 grams of oxygen per kilogram of hydrocarbon material. With air, a blowing rate of about 10 to about 100 liters per hour per kilogram of hydrocarbon is preferred. Generally about 90–97% of the oxygen reacts with the hydrocarbon material to form water and organic oxygen compounds. Little or no oxides of carbon are formed in the process.

Since purity of the finished petroleum coke is essential in view of the use for conversion into moderator graphite for nuclear reactors, it is preferred to start from materials which themselves contain little or no impurities such as metal compounds, boron compounds, and sulfur compounds. Thus residual oils are unsuitable for use in the process of the present invention. Examples of hydrocarbon materials which are suitable for use in the process of the present invention are straight-run distillates boiling between about 200° C. and about 600° C., deasphalted oils obtained as a product from the treatment of asphaltic residual oils with normally gaseous hydrocarbons such as propane, heavy oils, i.e., boiling above 180–220° C., obtained as a bottoms in the distillation of hydrocarbon products from conversion processes such as reforming, alkylation, and polymerization, and recycle oils obtained in cracking processes. Recycle oils from catalytic cracking processes are particularly suitable for use in the process of the invention. By "cycle oils" it is meant the hydrocarbon fractions usually boiling in the range of about 200 to 500° C. which are separated by distillation from the product obtained in catalytic cracking, and which may be recycled to the cracking process together with the feed. It is preferred to use heavy recycle oil having a boiling range of from about 300° C. to about 500° C.

It may be desirable at times to subject the hydrocarbon material to other refining processes prior to the treatment with oxygen or oxygen-containing gas. One refining process which may be used is catalytic desulfurization with hydrogen to remove sulfur.

The hydrocarbon material can be coked by any known process although it is preferred to use the more conventional processes widely used in the art, for example, the well known Dubbs process. The hydrocarbon material can, for example, be coked as follows. The hydrocarbon material to be cracked is pumped at a pressure of from 7 to 35 atm., preferably from 10 to 25 atm., through a pipe still, in which it is heated to a temperature of from 450 to 525° C., preferably from 475 to 510° C. This residence time in the pipe still is so short as to permit only a very slight degree of cracking. The material thus heated is then passed through a relatively large reaction chamber where a fairly intensive cracking occurs without substantial coke formation. The mixture leaving the reaction chamber is subsequently passed to a coke chamber where it is further cracked to coke, volatile products leaving the coke chamber and being charged generally to a fractionating column. After some time, generally a few hours, the coke chamber is entirely filled with coke.

The mixture leaving the reaction chamber is now passed to another coke chamber, the first one being emptied. The pressures and temperatures in the reaction chamber and coke chamber are slightly below the pressure and the temperature of the material leaving the pipe still.

The hydrocarbon material can also be coked without a reaction chamber. In this case the hydrocarbon material is passed direct from the pipe still to the coke chamber. In this process the temperatures employed are generally slightly higher than with the use of a reaction chamber preceding the coke chamber.

The hydrocarbon material can also be coked in a fluidized coke bed. In this process the hydrocarbon material, if desired, diluted with an inert gas such as nitrogen, is passed through a fluidized bed of carbon particles at atmospheric or superatmospheric pressure (for example up to approximately 4 atm. abs.) and at a temperature in the range 450 to 650° C. under such conditions that the contact time is preferably 5 to 60 seconds.

Petroleum coke prepared in the conventional manner usually has a relatively high content of volatile products (generally 5–15% by weight) which makes it necessary to subject the coke, prior to a graphitizing process, to calcination, for example, by heating it in a rotary kiln to a temperature in the range of from 1100° C. to 1400° C.

The coking and calcining can be accomplished in one stage by spraying the oxygenated liquid hydrocarbon onto calcined coke and heating in a rotary kiln at a temperature of 1100° C. to 1400° C. Coke leaving the kiln is screened and the fine-grained part is recycled to the kiln to serve as a carrier for the oxygenated hydrocarbon. It is preferred that the hydrocarbon material be oxygenated to such a degree that it is converted into coke almost immediately upon entering the kiln. This reduces the amount of hydrocarbon evaporated. Best results are obtained when the hydrocarbon material has been oxygenated sufficiently to obtain a product having a pour point of at least 50° C. and preferably at least 65° C.

Graphite is produced from calcined coke by grinding and sifting the coke to obtain a powder which is mixed with a suitable binder, formed into shapes, and heat treated. A binder for moderator graphite should have a carbon-to-hydrogen ratio (C/H) of about 1.5 to about 1.8. The binder most often used in the art is coal tar, which also must be of a high purity to be satisfactory for use in making moderator graphite. Mineral oils have been proposed as a substitute for expensive high purity coal tar but were found to be unsuitable as the graphite produced was very brittle owing to the irregular development of gas during graphitization.

A suitable binder can be prepared by fractionating the oxygenated hydrocarbon material described hereinbefore to obtain a bottoms product with a softening point (ring and ball) of at least 80° C. and preferably at least 90° C. It is also desirable for the binder to have a relatively high specific gravity, for example, at least 1.1 (25/25° C.).

In practice approximately 30 parts by weight binder are used per 100 parts by weight of calcined petroleum coke. The mixture of coke and binder is shaped into the desired form, such as cubes or rods, and heated (preferably in several stages) to be converted into graphite. The first heat is generally at relatively low temperatures of, for example, from 300 to 500° C. in order to remove volatile hydrocarbons present therein. Graphitization proper is effected by heating to temperatures between about 2500° C. and 3000° C., for example, in an electric kiln. After heating for 2 to 5 days the conversion to graphite is complete and the finished pieces are cooled very slowly before being exposed to air.

The finished graphite blocks are generally further subjected to a densifying treatment in order to fill the pores formed during conversion of the binder. This consists in impregnating the shaped graphite with a densifier to fill the pores and subjecting the impregnated blocks to a heat treatment in the range of 2500° C. to 3000° C. The densifier, generally having a carbon-to-hydrogen ratio of about 1.35, is also converted into graphite. This densifying process may be repeated until the graphite is of the desired density. About 5–10 parts by weight of densifier are used per 100 parts by weight of petroleum coke. A suitable densifier can be prepared by the same method described above for preparing a binder, although the distillation need not be so drastic. A residue having a softening point (ring and ball) of 70° C. and a specific gravity 25/25° C. of 1.08 is generally sufficient.

The following examples illustrate the practice of the present invention.

*Example I*

The starting material used in this example was a recycle oil produced by catalytically cracking a distillate obtained from a Venezuelan crude oil. The recycle oil had been subjected to a catalytic desulfurization treatment and had an initial boiling point of 315° C. and a final boiling point of 475° C., both temperatures determined by means of vacuum distillation but converted to atmospheric pressure.

A quantity of the above recycle oil was blown for 13½ hours with air at atmospheric pressure and a temperature of 250° C. The air was blown through at a rate of 20 liters per hour per kg. of the hydrocarbon material. The total quantity of oxygen used per kg. of oil was 58 liters, of which 96.3% reacted with the oil to form water and organic oxygen compounds.

The recycle oil thus pretreated with oxygen was then heated for one hour to 490° C. in an autoclave, after which it was cooled by means of air.

The coke yield in this thermal cracking treatment was not less than 28.5% by weight, based on the starting material.

In a control test in which the same recycle oil without pretreatment was subjected under the same conditions to a thermal cracking treatment, the coke yield was only 9.6% by weight.

The coke thus prepared had a high degree of purity and was found to be particularly suitable for conversion into moderate graphite for nuclear reactors by means of a graphitizing treatment.

*Example II*

Another quantity of the same recycle oil as used in Example I was similarly subjected to a pretreatment with air. The duration of the pretreatment was 21 hours at a temperature of 325° C. Air was blown through at a rate of 22.5 liters per hour per kg. of starting material.

The total quantity of oxygen used per kg. of oil was 99 liters, of which 96.0% reacted with the oil to form water and organic oxygen compounds.

The material thus pretreated was subjected in the same manner as described in Example I to a thermal cracking treatment, in which the oil was heated for one hour to 490° C.

The coke yield in this treatment was 48.0%. It was found that the coke thus produced had a high degree of purity and could be converted by means of a graphitizing treatment into a moderator graphite suitable for use in nuclear reactors.

*Example III*

The starting material used in this example was a bottom product obtained in the distillation of a thermally reformed naphtha derived from a Middle East crude oil.

The components present in this bottom product were formed by secondary reactions (e.g., alkylation of the olefins obtained in the primary reactions to aromatics) in the thermal reforming treatment and have a higher boiling point than the original naphtha which was subjected to the thermal reforming treatment.

A quantity of the above-described hydrocarbon material was subjected to a pretreatment with air at a temperature of 250° C. Air was blown through at a rate of 20.5 liters per hour per kg. of starting material for a period of 28 hours, approximately 84% of the oxygen reacted with the hydrocarbon material.

The material thus pretreated was subjected at a temperature of 500° C. and atmospheric pressure to a thermal cracking treatment in a fluidized coke bed.

A coke yield of 22.2% by weight was obtained, based on the starting material.

The resultant coke had a high degree of purity and was found suitable for conversion by means of a graphitizing treatment into moderator graphite for nuclear reactors.

In a control test in which another quantity of the said bottom product of a thermal reforming treatment without pretreatment with oxygen was subjected to a thermal cracking treatment in a fluidized bed, other conditions being the same, only 3.1% by weight of coke was obtained.

*Example IV*

The bottom product obtained from the distillation of a Middle East naphtha subjected to a thermal reforming treatment was treated with air under atmospheric pressure at a temperature in the range of from 200° C.–240° C. A total quantity of 300 liters of air per kilogram of starting material was used.

The air-treated product was then separated by distillation under a pressure of 70 mm. Hg into 55% by weight of a distillate boiling at this pressure up to 247° C. (corresponding to 340° C. at atmospheric pressure) and into 45% by weight of a residue with a softening point (ring and ball) of 90° C. and a specific gravity (25/25° C.) of 1.104.

The distillate was subjected to a coking treatment by heating it in a bomb for one hour at 500° C. and then keeping it at this temperature for one hour. This treatment yielded 20.2 percent by weight of coke of high purity.

The coke was ground and, together with part of the residue as a binder, worked up into shaped pieces, which were subjected by the conventional method of a graphitizing treatment.

*Example V*

A residual oil was obtained from a Venezuelan crude oil by distillation at atmospheric pressure, and vacuum distillation of the residue of the atmospheric distillation. The distillation was continued until approximately 20% by weight of residue was obtained, based on the starting material.

A deasphalting process was carried out with a propane/propylene mixture in a ratio of 4.3 parts by weight of solvent per part by weight of residual oil. The deasphalting process yielded approximately 40% by weight of purified oil having a viscosity of 40 cs. at 200° F.

The effect of the deasphalting treatment on the inorganic impurities content of the oil is shown by the following table.

| | Ash content, percent by weight | Lead, p.p.m. | Vanadium, p.p.m. | Boron, p.p.m. |
|---|---|---|---|---|
| Residual oil | 0.15 | 4.2 | 339 | 0.015 |
| Deasphaltized oil | 0.0014 | 0.04 | 0.8 | 0.0001 | p.p.m.=parts by weight per million.

The deasphalted oil was suitable material to be oxygenated and coked to produce a coke suitable for converting to graphite for use in nuclear reactors.

We claim as our invention:

1. A method for producing graphite suitable for use as a moderator in a nuclear reactor which comprises isolating a petroleum distillate of the group consisting of straight-run distillates boiling between 200 and 600° C. and catalytically cracked recycle oils boiling between 200 and 500° C., heating said distillate with an oxygen-containing gas until the oxygenated product so obtained has a pour point above about 50° C., coking the oxygenated product in a coking zone under thermal cracking and coking conditions whereby coke yields more than about three times as great are obtained than if when the oxygen treatment is omitted, said coke being substantially free from metals, calcining said coke at temperatures between 1100 and 1400° C., combining the calcined coke with a binder having a carbon-to-hydrogen atomic ratio between about 1.5 and about 1.8, and graphitizing the mixture of coke and binder at 2500–3000° C., for 2–5 days, whereby graphite product suitable for use as a moderator in a nuclear reactor is obtained.

2. A process according to claim 1 wherein from about 50 to about 175 grams of oxygen are used per kilogram of distillate.

3. A process according to claim 1 wherein the petroleum distillate is a reformate fraction boiling above about 180° C.

4. A process according to claim 1 wherein the petroleum distillate is a recycle oil obtained in a catalytic cracking process.

References Cited in the file of this patent

UNITED STATES PATENTS

| | | |
|---|---|---|
| 2,244,636 | Atwell | June 3, 1941 |
| 2,347,805 | Bell | May 2, 1944 |
| 2,587,703 | Deanesly | Mar. 4, 1952 |
| 2,775,549 | Shea | Dec. 25, 1956 |
| 2,905,615 | Arey | Sept. 22, 1959 |
| 2,913,395 | Hanson | Nov. 17, 1959 |
| 2,922,755 | Hackley | Jan. 26, 1960 |
| 2,959,535 | Brown et al. | Nov. 8, 1960 |